United States Patent [19]
McGough et al.

[11] Patent Number: 5,064,116
[45] Date of Patent: Nov. 12, 1991

[54] COIN HOPPER RELAY

[75] Inventors: Gerald B. McGough, Huntsville; Timothy M. Stanford, Arab; Charles J. Bass, New Hope, all of Ala.

[73] Assignee: Quadrum Telecommunications, Inc., Arab, Ala.

[21] Appl. No.: 524,570

[22] Filed: May 17, 1990

[51] Int. Cl.$^5$ ............ B65G 11/04
[52] U.S. Cl. ............ 232/57.5; 194/346
[58] Field of Search ............ 232/52.5, 44, 55; 194/344, 346

[56] References Cited

U.S. PATENT DOCUMENTS

| | | | |
|---|---|---|---|
| 2,698,713 | 1/1955 | Timms et al. | 232/57.5 |
| 3,030,008 | 4/1962 | Jensen | 232/57.5 |
| 3,759,440 | 9/1973 | Hamilton et al. | 232/57.5 |
| 3,759,441 | 9/1973 | Hamilton et al. | 232/57.5 |
| 4,386,690 | 6/1983 | McGough | 232/57.5 |
| 4,630,624 | 12/1986 | Turner | 194/346 |
| 4,841,563 | 6/1989 | Sano et al. | 194/346 |

*Primary Examiner*—Gary L. Smith
*Assistant Examiner*—Michael J. Milano
*Attorney, Agent, or Firm*—Robert J. Black

[57] ABSTRACT

An improved coin escrow mechanism for use in a coin telephone including movable plates located at the corners where the hopper chute joins with the collect and refund channels, respectively. The movable plates facilitate the deposit of additional coinage. Also included is a special notch in the hopper facilitating the easy assembly of the coin escrow mechanism, particularly as to a trigger switch actuator used for actuating the trigger switch on the relay portion of the mechanism.

9 Claims, 3 Drawing Sheets

COIN HOPPER RELAY

BACKGROUND OF THE INVENTION

1. Field of the Invention

This invention relates to telephone paystations, and more particularly to a coin escrow mechanism for temporarily storing and then either refunding or collecting coin deposits.

2. Background Art

Coin escrow mechanisms or coin relay hopper mechanisms have existed since coin telephones have existed. AT&T, GTE, and Northern Telecom have produced various designs for years for both the older three slot and more recent single slot coin telephones.

Early designs were predominantly of a double coil variety up until about 1960 when AT&T and then others introduced a single coil design with a round cross section tubular hopper similar if not identical with what AT&T uses today. Early designs did not contend with a multiple of large coin deposits, as typically a local telephone call was a nickel or dime. The AT&T hopper with a trap door and directing vane was probably a response to higher deposit requirements. Its storage capacity with a high degree of freedom from coin jams is about $3.00.

In approximately 1972, GTE introduced the single slot coin telephone in response to a previously introduced single slot coin telephone by AT&T. As a part of this program, a new design coin relay hopper was introduced. Rather than a round cross section tubular hopper, a rectangular cross section tubular hopper with two trap doors in a "V" notch configuration with a single central pivot point was used for holding and directing coins. Rather than the coin stack being controlled as in the AT&T configuration, the coins were allowed to stack at random. Its storage capacity with a high degree of freedom from coin jams was about $4.00.

Other design coin escrow mechanisms have also been introduced to the market, particularly from foreign sources in recent years. A predominant type is a rectangular cross section hopper with two trap doors in a "V" notch configuration with double outside pivot points on each door. Two coils are generally used for activation. Although these units have not been tested for capacity, they have often failed due to large current requirements for operation.

For a general understanding of the coin holder relay operation, reference is made to U.S. Pat. Nos. 3,759,440, 3,759,441 and 4,386,690, all of which are assigned to the same assignee as the present application.

In operation, the first coin exits the coin rejector and strikes the paddle of the trigger switch actuator to cause rotation and unlatch the first coin switch to the operate position. Subsequent coin deposits may further rotate the trigger switch actuator, but will not effect the first coin switch. Large coin deposits will fully rotate the actuator where the paddle arm slot is blocked and the paddle portion is completely out of the way in a pocket of the hopper making the trigger effectively transparent to coins. Coins are held in place by their respective collect and refund latches.

When a telephone call is completed or abandoned, the coins are collected or refunded, respectively. Voltage polarity as determined by the telephone operating company central office or other controlling circuits (positive for collect, negative for refund) is applied to the relay coil leads.

A magnetic field is generated by the relay coil which influences the selector card by virtue of its containing a permanent magnet to either rotate clockwise for collect, counter clockwise for refund. The magnetic field also subsequently causes the armature of the relay to close.

The rocker arm which is attached to the armature pushes the selector card down to operate the proper latch.

The latch selected is dependent upon which direction the selector card is rotated, i.e., the polarity of the voltage. Upon operation of a latch, the corresponding trap door will open and the coins will be released down either the collect or refund chute.

When the armature operates, it pushes the switch card which operates the entire contact spring pile up. The movement of the first coin switch will release the entire trigger switch actuator to return to the home position. It is held in the home position by a torsion spring.

When voltage to the relay is removed, the armature is returned to the home position by the margining spring and the timing spring. With the armature the rocker arm rotates and drives the selector card to its home position. The selector card in turn drives the operated latch to its non operate position which returns the door.

As the cost of telephone calls increases, the average amount held in escrow in the coin relay hopper and then either collected or refunded is increasing. If the telephone company has a maximum amount allowed in escrow, this maximum will be affected more and more often. If multiple collections are used, they will occur on a higher percentage of telephone calls.

Because test results indicate failure rates at 1% and 2% even at moderate coin loads, the coin relay hopper maintenance problems must be growing. What is necessary then is not to collect larger coin loads but to collect moderate coin loads more reliably.

Multiple collections at lower levels is not the answer. This approach requires increased supervision and once partial deposits are collected they cannot be refunded.

Coin capacity is the dollar value of the coins that can be collected or refunded on one operation of the coin relay hopper mechanism that meet electrical operate and reliability requirements. Generally, it is equal to the total value of the telephone call but as previously stated this may not be true.

In testing, the coinage used is an even mixture of nickels, dimes and quarters, as this is considered "worst case" conditions. Generally, capacity is increased as the percentage of dimes and quarters is increased. Electrical operate conditions used in testing are also "worst case", just slightly above the margining limits of the relay mechanism.

Failure can occur in five ways:

The coin relay does not operate at the minimum operate criteria or test criteria at the coin load specified. It does not have enough power to overcome the frictional forces of mechanism.

The hopper mechanism false discharges during the deposit of coins before normal energy is applied.

The relay operates properly but the coin load split between collect and refund.

The relay operates properly but the coin load jams and fails either partially or wholly to discharge down the collect or refund tube.

The coin load overflows and backs up into the previous subassembly.

In order to understand the coin capacity improvements of the invention, the following detailed discussion of some existing hopper assemblies and coin jamming modes is required.

Usually, the main body of the hopper assembly is a casting assembly which has three distinct areas: 1) the hopper or storage area being in effect a rectangular cross section tube, 2) the collect channel being a smaller rectangular tube angling off to the right at 45 degrees, and 3) the refund channel being a smaller rectangular tube angling off to the left at 45 degrees. The front and back of all tubes are in the same plane, the unit being of uniform width. The unit is essentially symmetrical when the storage area is split down the middle. All tubes are open ended.

The left and right hand sides of the storage area intersect the tops of refund and collect tubes, respectively, and create what we shall designate as the refund and collect corners.

Two trap doors, a refund trap door and collect trap door hinge on the same shaft located at the theoretical intersection of the bases of the refund and collect tubes. When closed, a door is perpendicular to the base of its tube, closing that tube by extending from the base to the top of the tube. When the open door rotates 90 degrees, it becomes flush with the base of its tube, while the opposite door remains in its operated position keeping its tube closed.

As the hopper assembly is symmetrical, our discussion will continue covering the right or collect side only, with the understanding that all arguments apply to the left or refund side also. The collect door configuration is that of a rectangular flat plate hinged on one end and latch operated. Along the edges of the plate that interfaces with the front and the back surfaces of the collect tube are three projecting fingers equally spaced. Corresponding to each of these fingers are grooves in the walls of the collect tube. Between the grooves are land areas flush with the front and backs of the collect tube. This finger and groove arrangement has the purpose of keeping thin coins, namely dimes, from sliding down past the edge of the door and the front and back of the tube. The grooves form 90 degree arcs with respect to the axis of rotation of the door.

The top of the collect door extends to the top of the collect tube to a position slightly below and the right of the collect corner. This is beneficial to the operation of the total coin relay hopper assembly as the tip of the collect door is protected from the weight of heavy coin loads. As the latch that operates the door is at a severe mechanical disadvantage to the door, these heavy loads could mean a non-operate condition when limited power is available.

In theory, coins stack at random in this type of hopper design. In practice, they follow patterns. One such pattern is where coins stack with their sides parallel to the refund door with their edges resting against the collect door. The axis of the stack is 45 degrees from vertical. When coin loads are large, this stack can pile up to the collect corner. Sometimes the stack is not perfect, coins partially extend into the stack. This will give the stack a "wedge" or tipped appearance. The part of the stack touching the collect door and under the collect corner is shorter than the part of the stack that extends away from the door. When the collect door opens, this "wedge" formation jams against the collect corner.

A variation of the above is where the pattern has a parquet appearance and the direction of the axis of one smaller interspaced stack is 90 degrees from the axis of the main stack. A "wedge" effect can also exist with this type of pattern.

In all of the above patterns coins slide or tumble rather than roll down the collect tube.

Another pattern is where a few coins turn vertical and rest against the side of the hopper. In this orientation it would appear that they would roll down the collect tube. The majority of the other coins would be in the center of the hopper in combinations of stacks and would be in the sliding or tumbling orientation. In these patterns a combination of two or more coin thickness and one quarter diameter can span or slightly exceed the width of the hopper or collect tube, thus the "fit" can become tight enough to jam. This pattern is referred to as the "T-bone" pattern or jam. It can have a configuration of an "I" when vertical coins are on opposite sides of the hopper.

The coin relay assembly needs to be field removable from the hopper assembly, therefore its mounting features need to be designed for quick change. Also, the paddle portion of the trigger switch actuator needs to be capable of being positioned into and out of the hopper without its being disassembled from the coin relay assembly.

On existing designs this is accomplished by a similar mounting arrangement. The primary task in relay removal is to disassemble two large screws at the bottom of the relay which face left center and right center. These screws go thru holes in the rather large left and right relay mounting arms which extend from the bottom of the hopper. There are mating tapped holes in the core bracket of the coin relay assembly into which these screws are driven. To complete dismounting there are one or two screws at the top of the relay that need to be removed. The mounting arm feature on existing hoppers are subject to warpage and critical dimensions are difficult to control.

The first coin switch on coin relay hopper assemblies is operated when a coin is deposited. One of the contact springs of this assembly interfaces with the cam portion of the activator. Adjustment of this spring at times is necessary to meet operate criteria.

In some designs one side of the adjustors access and vision is blocked by the arm of the trigger switch actuator that connects the shaft portion with the cam portion. This makes adjustment more difficult.

SUMMARY OF THE INVENTION

The invention basically relates to coin escrow mechanisms with certain enhancements in the areas of coin capacity, manufacturability, and serviceability.

As was done previously, the discussion below covers the collect side only with the understanding of equal applicability to refund side.

To modify the collect corner a rectangular opening was made in the hopper at the collect corner. A movable collect corner was used in place of the integral solid corner. The movable collect corner is attached to the hopper by a shaft which runs thru two bearing mounting holes on the outside of the hopper wall. The bearing mounting holes are directly above the collect corner. The collect corner tends to move as force is applied by the coin load. It is held in position or restored to the home position by torsion spring. Stops for positioning and limiting rotation are provided as an integral part of the hopper.

The movable corner initially provides the same collect tube geometry as the solid hopper. However, when a large coin load which is stacked in the "wedge" pattern is encountered, the movable corner expands the collect tube entrance as required. The "wedge" is allowed to move thru upon collect door operation. After the coin load moves thru, the movable corner is returned to its original position by the torsion spring. The torsion spring force is critical: it must be strong enough to control the stack of coins, i.e., remain very close to its initial position as coins are loaded and yet be weak enough to allow passage of a "wedge" formation when the collect door is operated.

The collect tube is gradually widened in steps below the initial collect door plane. This is accomplished by widening the land area after the first door groove slightly widening the land after the second grove slightly more, and widening the area after the last groove to the end of the collect tube slightly more yet. Because of this gradual widening, coins which get in the "T bone" pattern will be offered less resistance as they move down the tube and will be less likely to jam.

The change in the trigger switch actuator is that in the new design the paddle slot at the top of the hopper cannot become jammed. The shape of the paddle arm of the new actuator which extends into the paddle arm slot in the hopper is designed such that upon rotation the slot will be kept closed to potentially jamming coins. The paddle portion is designed to rotate out of the way of the load of coins in the hopper so as not to disturb their egress.

The trigger switch pile up adjustment was also made easier in the new trigger switch actuator design. The cam arm of the actuator which extends to the cam was designed to be out of the way physically and for visibility purposes during adjustment.

The coin relay mounting arrangement of the present invention consists of four screws, all of which directly face the maintenance person. Dismounting is quick since all screws require only one-quarter turn to allow the relay to be lifted up and out. This is accomplished by four tapped bosses on the hopper perpendicular to its face which mate to keyholes for the top two screws and slots for the bottom two screws on the relay assembly. The trigger switch portion of the coin relay is fed out thru its mating slot and the top opening in the hopper.

DESCRIPTION OF THE PREFERRED EMBODIMENT

Figure 2:
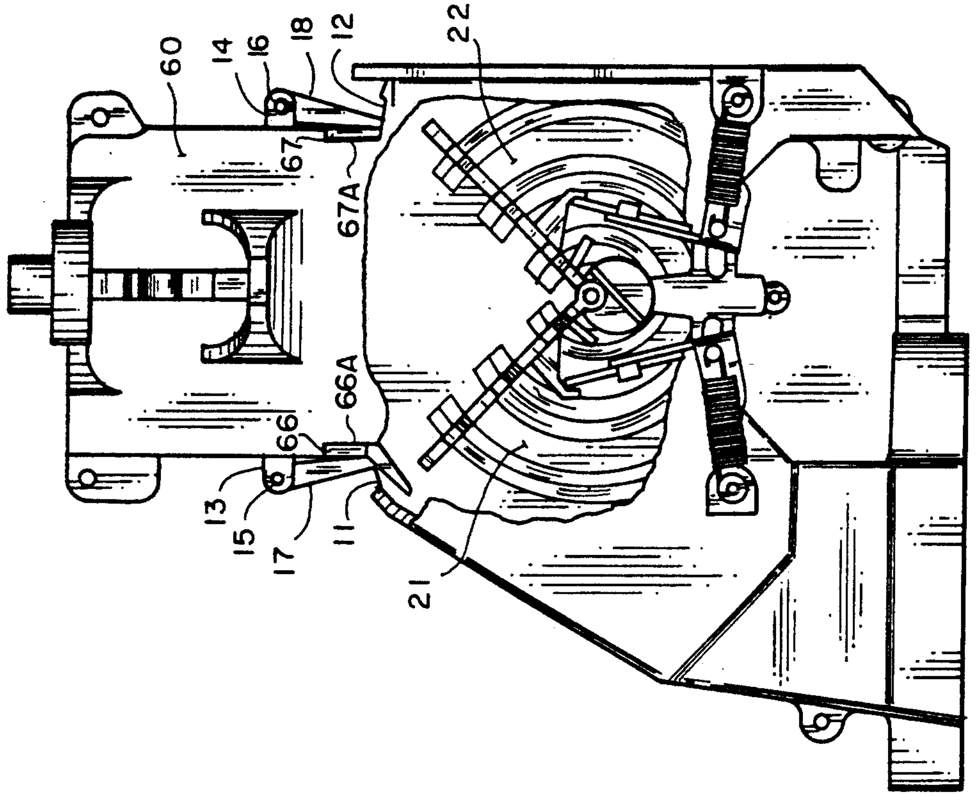
FIG. 2 is a partially sectionalized rear view of a coin hopper relay in accordance with the present invention.
Figure 1:
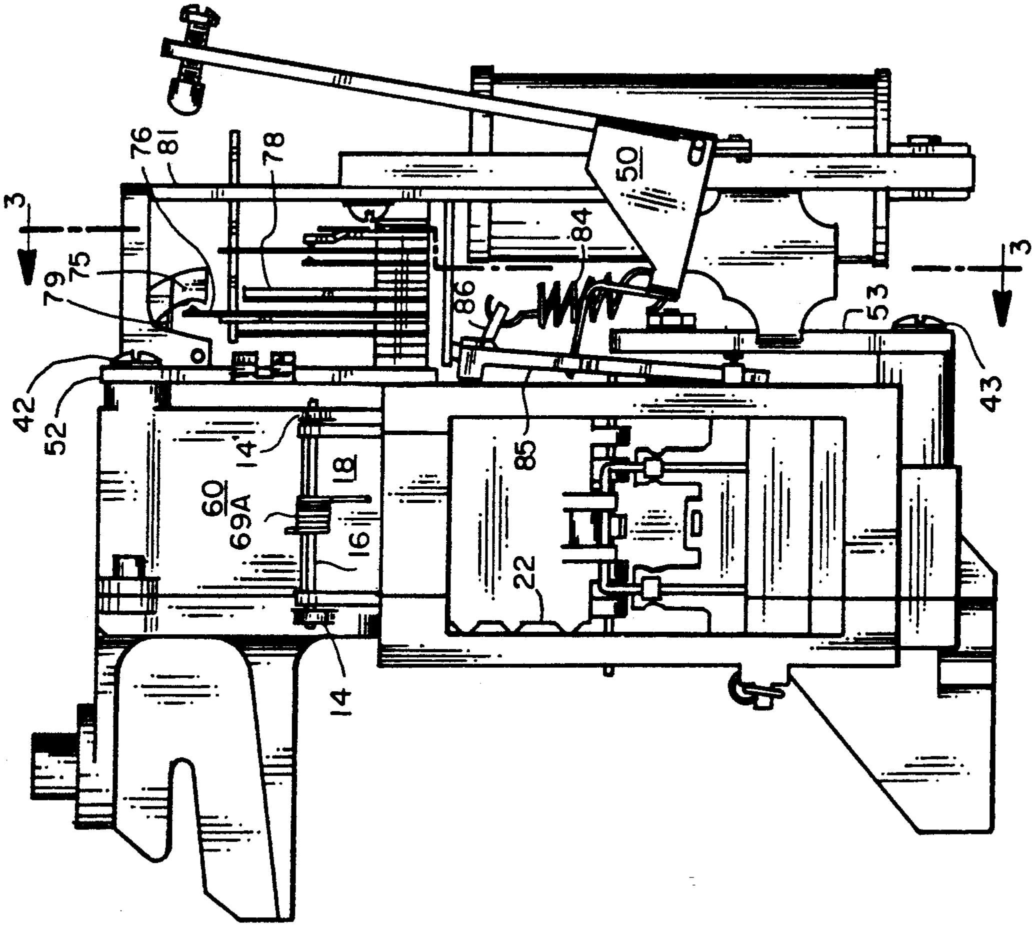
FIG. 1 is a side view of the refund side of a coin hopper relay in accordance with the present invention.
Figure 4:
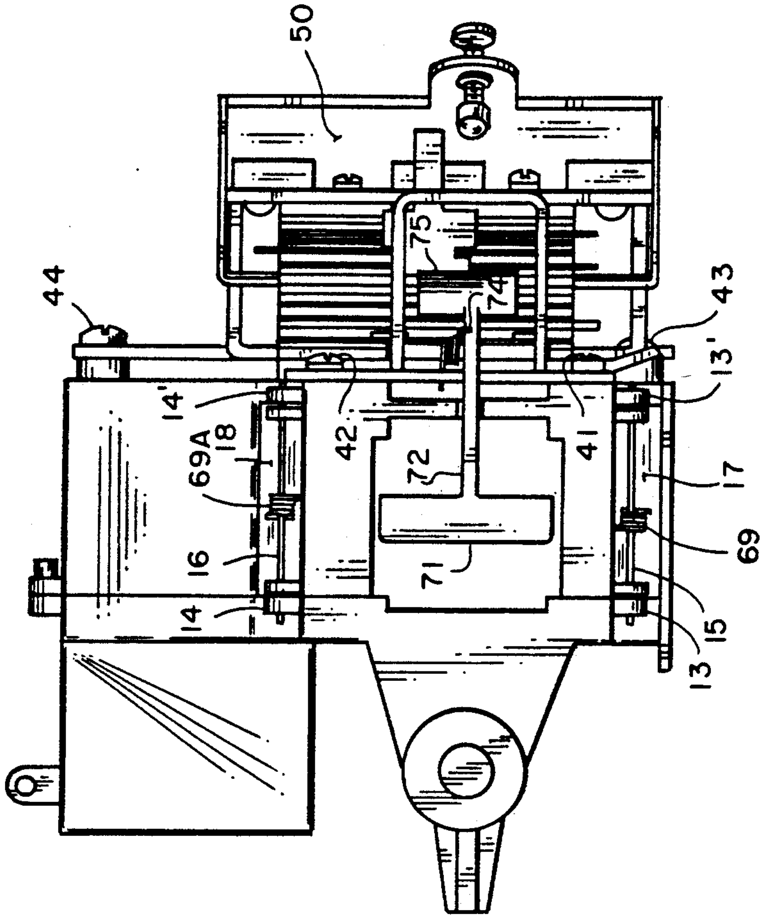
FIG. 4 is a top view of a coin hopper relay in accordance with the present invention.
Figure 3:
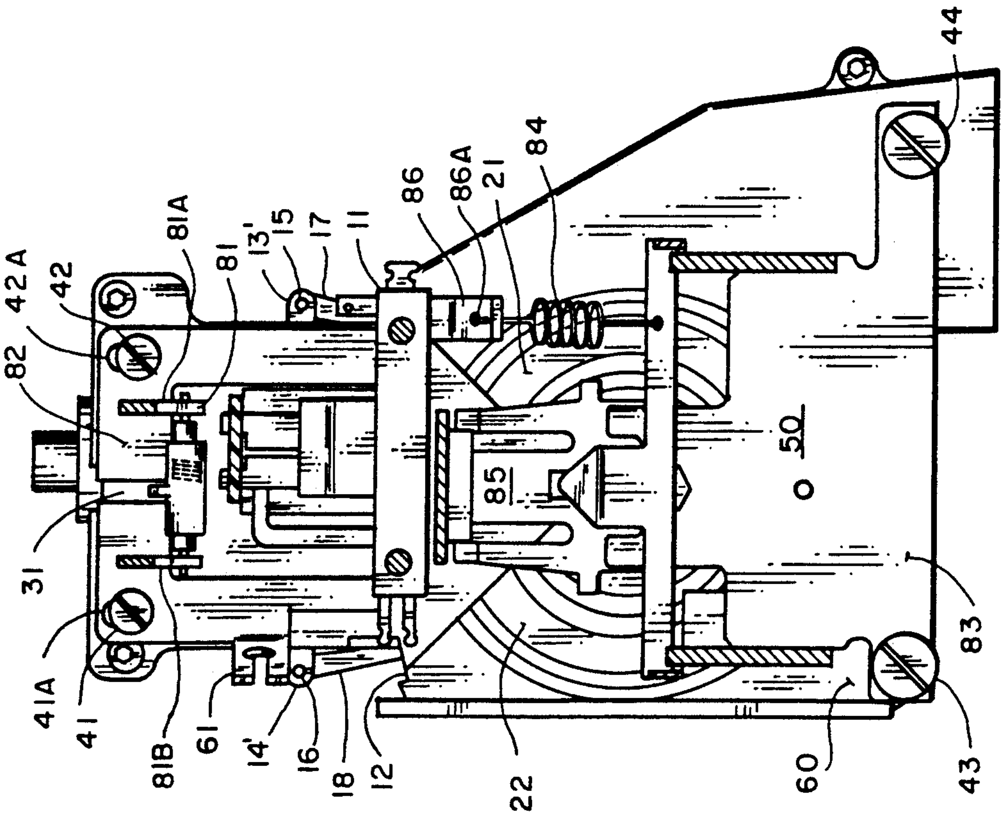
FIG. 3 is a partially sectionalized front view of a coin hopper relay in accordance with the present invention.
Figure 5:
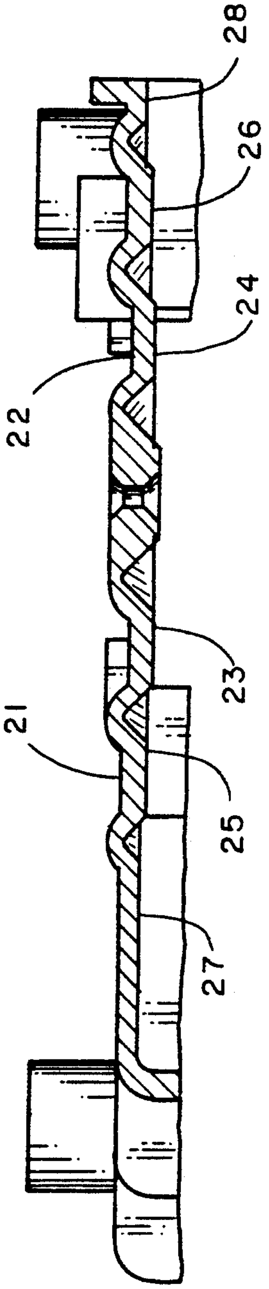
FIG. 5 is a sectionalized view of a portion of the collect and refund channels employed in a coin hopper relay in accordance with the present invention.
Figure 6:
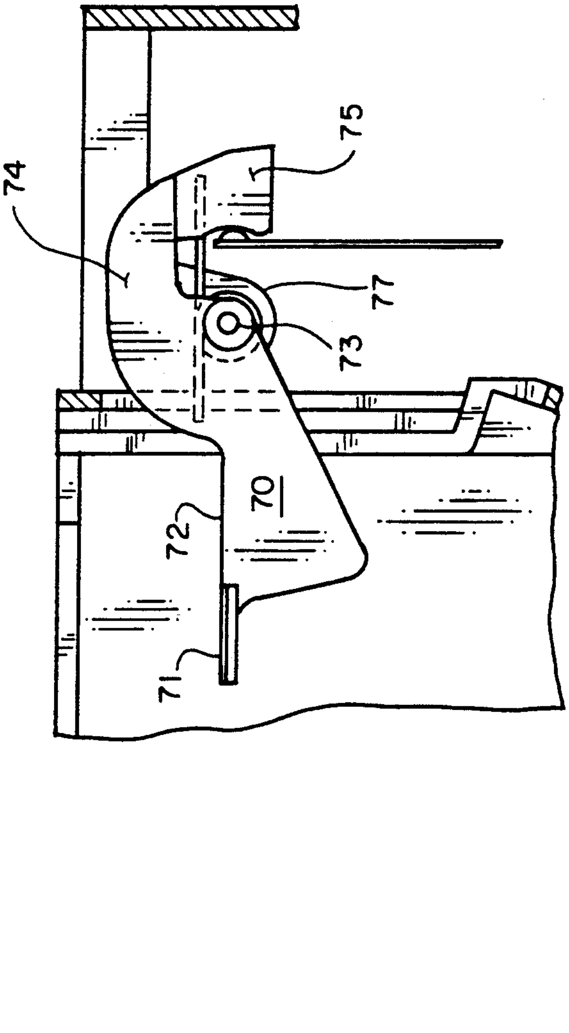
FIG. 6 is a side view of a trigger switch actuator for use in a coin hopper relay in accordance with the present invention.

Referring now to the associated drawings, improvements include:

provision for mounting movable collect and refund corners. This includes rectangular openings 11 and 12 at the positions previously occupied by internal solid corners. Also, it includes adding mounting holes 13, 13', 14 and 14' for the bearing shafts 15 and 16 of the movable corners 17 and 18;

widening gradually the collect and refund tubes 21 and 22 by reducing the height of the land areas 23 thru 28 between grooves in steps as proceeding down the tube;

a slot 31 at the top of the hopper allows for field removal of the coin relay assembly from the hopper assembly;

and four forward facing tapped holes and screws 41, 42, 43 and 44 allow for mounting the coin relay assembly 50 to the hopper assembly 60 and for quick field dismounting.

The trigger switch actuator 70 is a plastic molded piece which has five sections: the paddle 71, paddle arm 72, shaft 73, cam arm 74, and cam 75. The paddle portion is a thin horizontal rectangular plate. Coins strike the paddle 71 when exiting the rejector to rotate the trigger switch actuator 70. The arm portion 72 between the paddle 71 and the shaft 73 is a thin vertical arched wall which continuously keeps its corresponding slot 31 in the hopper 60 filled so as to keep out jamming coins. The shaft portion 73 has an enlarged cylinder shape with small end cylinder projections which act as bearings in mating holes in the trigger support bracket 77. The arm portion 74 between the shaft 73 and the cam 75 is a thin arched vertical wall which is above the contact spring 76 from the spring pile-up 78. The cam portion 75 contains a slot for locating the torsion spring 79.

The trigger switch actuator support bracket 81 is a metal plate with two formed arms for mounting the trigger switch actuator 76 and in conjunction with the pile-up bracket 82 and core bracket 83 provide for mounting the coin relay assembly 50 to the hopper assembly 60. It also provides a mounting surface for margining spring 84 and guides the switch card 85.

The two arms are formed in a "U" shape. Opposite each other on the two arms are bearing holes for the trigger switch actuator. The metal plate portion of the part is attached to the coil core (not shown). The two arms 81A and 81B reach to and interlock with the pile-up bracket 82.

The pile-up bracket 82 is a rectangular metal plate with the center portion removed and a small formed tab 86 to which the margining spring 84 is attached. The plate mounts vertically to the top front face of the hopper 60 assembly.

The pile-up bracket 82 provides a base to which the spring pile-up 78 mounts, a strain relief portion 61 for wiring, two mounting screw key holes 41A and 42A for attachment of the coin relay assembly 50 to the hopper 60, two slots for interface with the trigger switch actuator support bracket (not shown), a tab 86 for adjustment of the relay margining spring 84, a slot 86A for locating the margining spring 84, and a slot for trigger switch actuator clearance.

The movable corners 17 and 18 offer the same shape to the coins as the previous solid integral corner. They fit into the rectangular openings 11 and 12 in the coin hopper 60. They rotate about shafts 15 and 16 which are attached to the hopper 60. They are rectangular plastic molded plates, angled at 45 degrees in approximately the center and hinged along one edge. The tip of the movable corner acts as a stop when it strikes the top of the collect 21 or refund tube 22. Two projections 66 and 67 on either side act as stops in the normal position when they hit corresponding notches 66A and 67A in the hopper. The force required to rotate the movable corner is critical and is controlled by a torsion spring 69A or 69B. A shaft, either 15 or 16, is used to mount the movable corner and its torsion spring to the hopper.

The trigger switch actuator 70 which in conjunction with a slot and pocket feature in the hopper 60 rotates out of the way for reliable discharge of coin deposits, blocks the arm entrance slot upon rotation such that coins cannot become jammed. The trigger switch actuator cam arm 74 which connects the shaft portion 73 of the actuator to the cam portion 75 has an arched shape so as to allow accessability and visibility during trigger switch adjustment.

An opening 31 at the top of the hopper allows for the entrance of the paddle portion 71 of the trigger switch actuator 70 during coin relay assembly. This eliminates the need for a horizontal slot inside of the hopper which has a propensity for coin jams.

Movable collect 17 and refund corners 18 in conjunction with corresponding hopper features allow for expansion of the collect 21 or refund tube 22 and the reliable passage of large coin deposits, while gradually widening collect 21 and refund tubes 22 with reduced height of land areas 23 thru 28 between grooves provide for the reliable discharge of coins.

While but a single embodiment of the present invention has been shown it will be obvious to those skilled in the art that numerous modifications may be made without departing from the spirit of the present invention which shall be limited only by the scope of the claims appended hereto.

What is claimed is:

1. A coin escrow mechanism for use in a coin telephone, adapted for temporarily storing, and then refunding, or in the alternative collecting coins deposited in said coin telephone, said coin escrow mechanism comprising a relay, a hopper including a chute and collect and refund channels for the temporary storage of coins, said chute including at least one corner joining at least one of said channels, the improvement comprising:

a movable plate located at said corner operated in response to an excessive amount of coinage being deposited in said chute and transmitted into said one of said channels whereby said movable plate is moved from a first position to a second position facilitating the further deposit of additional coinage in said one channel;

and said hopper further including a notch through which a trigger switch actuator extends from said chute to an adjacent external location in proximity to a trigger switch located on said relay.

2. A coin escrow mechanism as claimed in claim 1 wherein:

said chute includes a first corner joining said collect channel and a second corner joining said refund channel and a movable plate located at each of said corners operated in response to an excessive amount of coinage being deposited in said chute and transmitted into said channels whereby said movable plates are moved from a first position to a second position facilitating further deposit of additional coinage in said channels.

3. A coin escrow mechanism as claimed in claim 1 wherein:

said hopper further includes a pair of bearings supporting an axle on which said movable plate is mounted and a spring biasing said plate towards said first position.

4. A coin escrow mechanism as claimed in claim 1 wherein:

said trigger switch actuator includes a shaft portion movably supporting said actuator on said hopper;

a paddle portion extending into said chute, a cam portion positioned outward of said hopper and adjacent said trigger switch;

a paddle arm joining said paddle to said shaft;

and a cam arm joining said cam to said shaft.

5. A coin escrow mechanism as claimed in claim 1 wherein:

the surface of at least one of said channels includes at least one grooved surface.

6. A coin escrow mechanism as claimed in claim 5 wherein:

said grooved surface in said one channel includes a plurality of lands and a plurality of grooves.

7. A coin escrow mechanism as claimed in claim 6 wherein:

the height of said land areas located between said grooves are each of a different height.

8. A coin escrow mechanism as claimed in claim 7 wherein:

the height of said land areas located between said grooves is dimensionally reduced in sequential steps from a first location to a second location in said one channel.

9. A coin escrow mechanism as claimed in claim 5 wherein:

each of said channels further include at least one internal surface including a plurality of lands and grooves;

the height of said land areas located between said grooves is dimensionally reduced in sequential steps from a first location to a second location in each of said channels.

* * * * *